United States Patent [19]
Ishii

[11] 3,971,523
[45] July 27, 1976

[54] ENDLESS TAPE CARTRIDGE
[75] Inventor: Masaaki Ishii, Tokyo, Japan
[73] Assignee: Canon Kabushiki Kaisha, Tokyo, Japan
[22] Filed: Aug. 6, 1974
[21] Appl. No.: 495,211

Related U.S. Application Data
[63] Continuation of Ser. No. 242,879, April 7, 1972, abandoned.

[30] Foreign Application Priority Data
Apr. 14, 1971  Japan............... 46-28622[U]
Apr. 14, 1971  Japan............... 46-28623[U]
Apr. 14, 1971  Japan............... 46-28624[U]
Apr. 14, 1971  Japan............... 46-28625[U]
Apr. 14, 1971  Japan............... 46-28628[U]

[52] U.S. Cl............... 242/55.19 A; 360/93
[51] Int. Cl.²............... G11B 23/10
[58] Field of Search............... 242/55.19 A, 55.19 R; 360/93

[56] References Cited
UNITED STATES PATENTS

| | | | |
|---|---|---|---|
| 2,922,642 | 1/1960 | Cousino | 242/55.19 A |
| 2,964,256 | 12/1960 | Gorey | 242/55.19 A |
| 3,025,012 | 3/1962 | Fries | 242/55.19 A |
| 3,140,837 | 7/1964 | Cailliot | 242/55.19 A |
| 3,228,619 | 1/1966 | Hardin | 242/55.19 R |
| 3,773,272 | 11/1973 | Wallace | 242/55.19 A |

Primary Examiner—Billy S. Taylor
Attorney, Agent, or Firm—William R. Woodward

[57] ABSTRACT

An endless tape cartridge, preferably for use with magnetic recording-reproducing apparatuses, comprises a plurality of loose rollers opposed to one end face of an endless tape coil in the cartridge and disposed radially of the tape coil. Within the cartridge, brake means having its end face for uniform resilient engagement with the end face of the tape coil is cockably or pivotally mounted. The brake means is arranged so that its resilient pressure force imparted to the coil end face may be released from outside the cartridge through openings formed in the cartridge wall.

7 Claims, 22 Drawing Figures

ENDLESS TAPE CARTRIDGE

This is a continuation of application Ser. No. 242,879, filed Apr. 7, 1972 and now abandoned.

BACKGROUND OF THE INVENTION

1. Field of the Invention

This invention relates to improvements in an endless tape cartridge, and more particularly to an endless tape cartridge which is provided with a plurality of rollers rotatable about their own axes and capable of friction contact with one end face of an endless tape coil wound within the cartridge and a brake member having its brake force releasable from outside the cartridge.

2. Description of the Prior Art

There is known an endless tape cartridge in which an elongated narrow strip such as magnetic tape or like material is wound in a coil form around a take-up core so that the strip is led out from its innermost layer and brought into frictional contact with a magnetic head through a tape guide, whereafter the strip is moved by drive means including a capstan, pinch roller, etc. and thence the strip is wound onto the outermost layer of the tape coil through guide means. Such an endless tape cartridge has encountered the following two problems in use.

1. Where the endless tape cartridge is inserted for use in a machine such as magnetic recording-reproducing apparatus or the like with the cartridge positioned upside down, one end face of the endless tape coil in the cartridge may be brought into contact with the cover plate of the cartridge from gravity, thereby causing a frictional resistance to be produced between that end face of the tape coil and the cover plate and thus preventing smooth feeding of the tape.

2. When the endless tape cartridge is removed out of the magnetic recording apparatus or the like, means such as take-up core, guide roller, pinch roller, etc. within the cartridge are brought into idle positions, which would cause loosening of the tape coil in the cartridge if the cartridge is carried with its user and subjected to some vibrations, and such loosening would in turn cause the tape of the coil either to be slackened in the interior of the cartridge or to be exposed outwardly of the cartridge and unwound sufficiently to prevent the tape from being taken up. Thus, the tape coil would have too tight portions and slack portions formed locally therein, and this would again prevent smooth feeding of the tape when such cartridge is placed in the magnetic recording-reproducing apparatus or the like.

Various attempts to solve these problems have been proposed heretofore.

For the solution to the first of the foregoing two problems, U.S. Pat. No. 2,918,536 and U.S. Pat. No. 3,025,012, for example, disclose the systems whereby a plurality of rollers mounted to the cover plate of an endless tape cartridge are rotatable to rotate a tape coil on the rollers and thus effect smooth feeding of the tape when the cartridge is used in upsidedown or reversed position. Although these conventional rollers can achieve the function of rotating the tape coil, they cannot serve the function of winding the tape coil of varying diameter substantially at an equal velocity throughout its entire length from its innermost layer to its outermost layer.

As regards the second of the above-noted problems, a solution has been proposed as by U.S. Pat. No. 3,161,362 which discloses a system whereby a brake force is imparted to a tape take-up core or reel hub within an endless tape cartridge when the cartridge is not in use, or by U.S. Pat. No. 3,027,112 and U.S. Pat. No. 3,341,145 which show the systems whereby a brake force is imparted to a reel bed supporting an endless tape coil thereon to thereby prevent loosening of the tape coil.

Any of these brake mechanisms does not directly impart a brake force to the endless tape coil within the cartridge, but imparts a brake force to the tape coil core, reel hub or reel bed to thereby indirectly prevent loosening of the tape coil. Actually, however, the tape coil wound on the coil core is shiftable on the reel bed, and therefore any vibration imparted to the cartridge wound correspondingly cause the tape coil therein to be locally loosened or tightened. It will thus be seen that simply fixing the reel hub, reel bed or similar means does not provide a sufficient prevention. In particular, the tape coil contained in the endless tape cartridge of the described type is wound around a shiftable tape core due only to the tension of the tape itself, which tension is usually of so small a magnitude as to make the entire tape coil to be loosely wound around the reel hub or bed. As will readily be recognized, such tape coil tends to form locally loosened or tightened portions in response to any slight vibration imparted thereto, and this would lead to a hindrance in accomplishing smooth tape feed with the cartridge in use.

To overcome such disadvantages, other types of brake mechanisms have been proposed, for example, a mechanism as disclosed in U.S. Pat. No. 3,285,526 which imparts a brake force to the outermost circumferential surface of an endless tape coil, or mechanisms as shown in U.S. Pat. No. 3,922,642 and U.S. Pat. No. 2,951,654 wherein a brake force is imparted to a part of the upper end face of an endless tape coil so as to prevent loosening of the tape coil. These mechanisms are more effective than those described above in that the tape coil is directly fixed, but they still suffer from disadvantages that the brake force imparted from the brake mechanism is directed only to a part of the outermost layer surface or the upper end face of the tape coil, thus failing to impart a uniform brake force to the entire tape coil and instead, imparting only a local force to a limited part of the tape to thereby injure the tape at last. Further, none of these brake mechanisms is of the type which permits a cartridge to be used both in normal and reversed positions, and this has meant limitations in practical use.

The prior arts structure have been successful to some extent in individually solving the problems mentioned under items (1) and (2) above, but no solution has been proposed as yet to overcome the two problems at a time. A simple combination of the prior techniques, such as a plurality of loose rollers and a brake mechanism simply combined together and incorporated in a cartridge, would necessarily lead to bulkiness of the cartridge. Especially, incorporation of various members in a compact endless tape cartridge for use with compact magnetic recording-reproducing apparatuses, for which demand is increasing rapidly, has been difficult both in light of spatial limitations and manufacturing technique.

SUMMARY OF THE INVENTION

It is an object of the present invention to provide a compact endless tape cartridge which has eliminated the abovenoted various disadvantages and which is usable with compact magnetic recording-reproducing apparatuses.

It is another object of the present invention to provide an endless tape cartridge of the described type wherein a plurality of rollers rotatable about their own axes and capable of frictional contact with an endless tape coil in the cartridge are loosely mounted in opposed relationship with the tape coil so that the tape coil may be rotatably carried by the rollers when the cartridge is used in its reversed position and wherein a brake member for imparting a pressure force substantially uniformly to one end face of the tape coil except during the use of the cartridge is provided and adapted to have its imparted pressure releasable from outside the cartridge.

It is still another object of the present invention to provide an endless tape cartridge of the described type wherein a plurality of loose rollers are opposed to one end face of an endless tape coil and disposed radially of the tape coil wound around a reel hub in the cartridge and wherein each of the rollers is of such a shape that the outer diameter thereof is gradually reduced from its portion corresponding to the innermost layer of the tape coil toward its portion corresponding to the outermost layer of the tape coil, whereby the tape as moved toward the outermost layer of the coil may be smoothly fed through the clearance between the reel flange and the rollers.

It is yet still another object of the present invention to provide an endless tape cartridge of the described type wherein a plurality of loose rollers are opposed to one end face of an endless tape coil and disposed radially of the tape coil wound around a reel hub in the cartridge, wherein a brake means is cockably or pivotally mounted on a surface supporting the rollers so that the end face of the brake means may normally be in resilient contact with the corresponding end face of the tape coil, and wherein the cartridge housing has a very small height and the brake member may be cocked up within the limit of the roller diameter to reduce its own brake force, whereby smooth tape feeding may be accomplished with the acid of the loose rollers even in the reversed position of the cartridge.

BRIEF DESCRIPTION OF THE DRAWINGS

Other features of the present invention will become fully apparent from the following detailed description of various embodiments thereof taken in conjunction with the accompanying drawings, in which:

FIG. 1-B is a cross-sectional view taken along line B—B of FIG. 1-A;

FIG. 1-C is a cross-sectional view of the FIG. 1-B cartridge as it is used in reversed position;

FIG. 2-B is a cross-sectional view taken along line B—B of FIG. 2-A;

FIG. 2-C is a cross-sectional view of the FIG. 2-B cartridge as it is used in reversed position;

FIG. 2-D is a right-hand side view of the FIG. 2-A cartridge;

FIG. 8-B is a cross-sectional view taken along line B—B of FIG. 8-A;

FIG. 8-C is a cross-sectional view of the FIG. 8-B cartridge as it is used in reversed position;

FIG. 9-B is a cross-sectional view taken along line B-B of FIG. 9-A;

FIG. 9-C is a cross-sectional view of the FIG. 9-B cartridge as it is used in reversed position;

FIG. 10-B is a cross-sectional view taken along line B—B of FIG. 10-A;

FIG. 10-C is a cross-sectional view of the FIG. 10-B cartridge as it is used in reversed position; and FIG. 10-D is a sectional view showing a modified form of the FIG. 10-B cartridge.

DESCRIPTION OF THE PREFERRED EMBODIMENTS

Figure 1A:
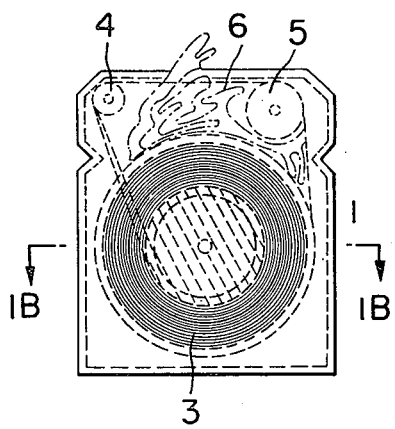
FIG. 1-A is a front view of an endless tape cartridge according to the prior art.
Figure 1B:
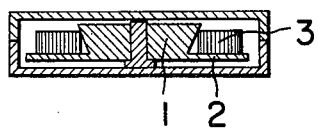
Figure 1C:
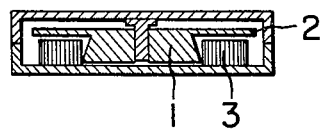
Figure 2A:
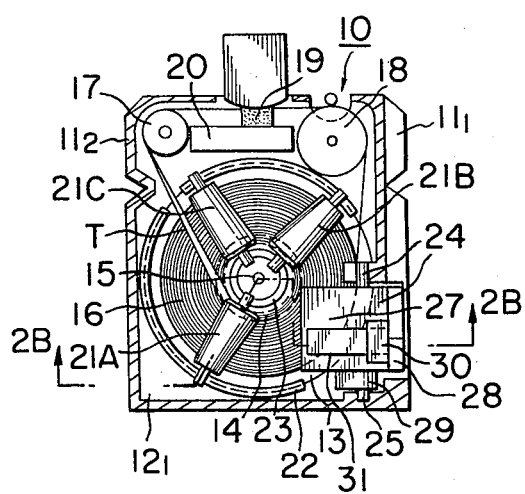
FIG. 2-A is a front view of an embodiment of the endless tape cartridge according to the present invention with the cover plate thereof being removed.
Figure 2C:
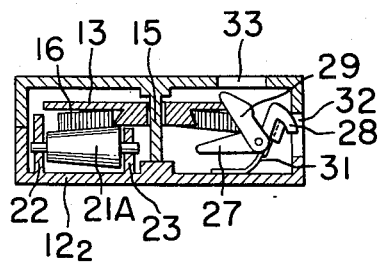
Figure 2D:
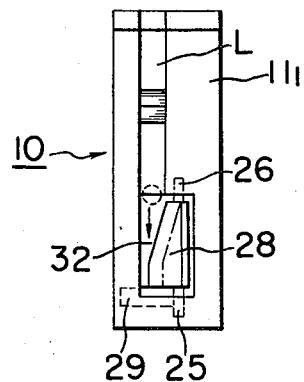
Figure 2B:
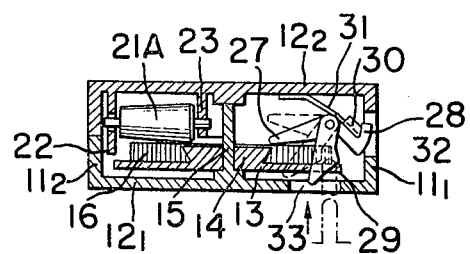

Description will first be made of the endless tape cartridge of the prior art as shown in FIGS. 1-A to 1-C.

An endless tape cartridge having an endless magnetic tape wound therein has usually comprised a tape-like cylindrical core 1 with an integral reel flange 2 for supporting a coil 3 of magnetic tape thereon, as shown in FIGS. 1-A and 1-B. The magnetic tape may be led out from the innermost layer of the coil 3 and guided along a guide roller 4 and a pinch roller 5 so as to be wrapped around the outermost layer of the tape coil 3, whereafter the tape web may be passed to extend across a head insertion opening formed in the cartridge between the guide roller 4 and the pinch roller 5. Such an endless tape cartridge for universal use, when actually used in a position as shown in FIG. 1-B, will cause the reel hub 1 and the reel flange 2 integral therewith to be driven in response to the movement of the tape, whereby the tape coil 3 on the reel flange 2 may be driven to rotate with the reel flange 2. Thus, the tape web, after passing the pinch roller 5, may be smoothly wound on the outermost layer of the tape coil 3 without any slack being produced in the tape. In fact, however, such a cartridge is often used in the position as shown in FIG. 1-C, which is a reversed position with respect to the position of FIG. 1-B. In such a reversed position, the tape coil 3 is disengaged from the reel flange 2 due to gravity and one end face thereof is brought into contact with the inner surface of the cartridge's cover plate. When the tape is led out from the innermost layer of the tape coil 3 in this position of the cartridge, the frictional resistance as produced between the coil end face and the inner wall of the cover plate will prevent the coil from being duly driven, so that tension will be developed locally in the tape coil 3 with a result that an insufficient amount of tape is wound on the outermost layer of the tape coil, thus causing a slack in the tape as indicated by 6 in FIG. 1-A or in the worst case, the tape will be so much entangled that it cannot be taken up at all.

Referring to FIGS. 2-A to 2-D, an embodiment of the endless tape cartridge according to the present invention is shown in front view, sectional views and side view, respectively. The endless tape cartridge, generally designated by reference numeral 10, includes opposite side walls $11_1$ and $11_2$, a bottom plate $12_1$ and a top or cover plate $12_2$. Within the cartridge 10, there is a reel flange 13 having a tapered core 14 formed centrally thereof. The take-up core 14 is formed with a center bore, in which a fixed pin 15 formed integrally with the bottom plate of the cartridge 10 is received to hold the reel flange 13 for rotation. The center bore in the take-up core 14 has a diameter greater than that of the pin 15 so as to permit the reel flange 13 to slide downwardly with respect to the pin 15 due to gravity when the cartridge is used in its reversed position (see FIG. 2-C). A magnetic tape coil 16 is mounted on the reel flange 13. A guide roller 17 and a pinch roller 18 are shiftably mounted on respective fixed shafts studded in the bottom wall of the cartridge 10. A felt pad 19 is attached to an intermediate wall 20 formed integrally with the bottom plate of the cartridge 10. The tape web T is led out from the innermost layer of the tape coil 16 wound around the take-up core 14 of the reel flange 13, and passed over the guide roller 17 and pinch roller 18 and along the front face of the felt pad 19 therebetween until it is taken up on the outermost layer of the tape coil 16. A plurality of tapered rollers 21A, 21B and 21C are disposed radially of the tape coil 16 and rotatably and loosely journalled to concentric circular walls 22 and 23 integral with the cover plate $12_2$, in the manner as shown in FIG. 2-B.

Each of the loose rollers 21A, 21B and 21C is shaped in the form of a tapered roller whose diameter is gradually reduced in the outward direction away from the reel hub, with its maximum diameter closely spaced apart from an adjacent end face of the coil core to provide a slight clearance therebetween. Thus, at the area corresponding to the outermost layer of the tape coil 16, the spacing between the reel flange 13 and the roller 21A, 21B or 21C exceeds the width of the tape T so as to readily permit the tape T to be fed to the outermost layer of the coil.

Figure 3:
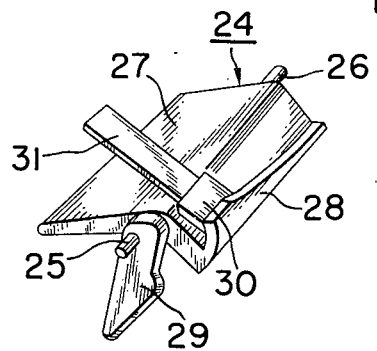
FIG. 3 shows, in perspective view, a brake member incorporated in the cartridge of the present invention.

Referring now to FIG. 3, brake means is generally designated by 24 and includes pivot pins 25 and 26 and a winglike member 27 on which the pins 25 and 26 are formed. The winglike member 27 can uniformly bear against one end face of the tape coil 16, and has a cam member 28 formed at one end thereof and another cam member 29 formed on the pin 25. The wing-like member 27 is mounted to the cartridge in such a manner that its engagement with the coil end face is releasable from outside the cartridge as will be fully described below. A fixing member 30 is provided on the wing-like member 27 to secure a plate spring 31 thereto.

Turning back to FIG. 2-A, the brake means 24 is mounted to the cartridge 10 with its pivot pins 25 and 26 received in recesses formed in the inwardly directed projections extended from the inner surface of the side wall $11_1$. The end face of the wing-like member 27 is normally biased into resilient contact with the end face of the tape coil 16 by the force of the plate spring 31 and the like (see FIG. 2-B). The cam members 28 and 29 formed integrally with the wing-like member 27 are disposed in opposed relationship with access openings 32 and 33 formed through the side wall $11_1$ and bottom wall $12_1$ of the cartridge 10 so that these cam members may be operated from outside the cartridge (see FIGS. 2-B and 2-D).

When the cartridge 10 is removed from a magnetic recording-reproducing apparatus to be described, the brake means 24 will assume a position in which the end face of the wing-like member 27 is uniformly resiliently engaged with the corresponding end face of the tape coil by the force of the plate spring 31 to thereby hold the tape coil 16 between the wing-like member 27 and the reel flange 13, thus applying a brake force to the tape coil.

In this way, the tape coil 16 is directly braked by a brake force resulting from the uniform resilient contact force of the brake means 24, without the tape coil being loosened in any portion thereof.

Figure 4:
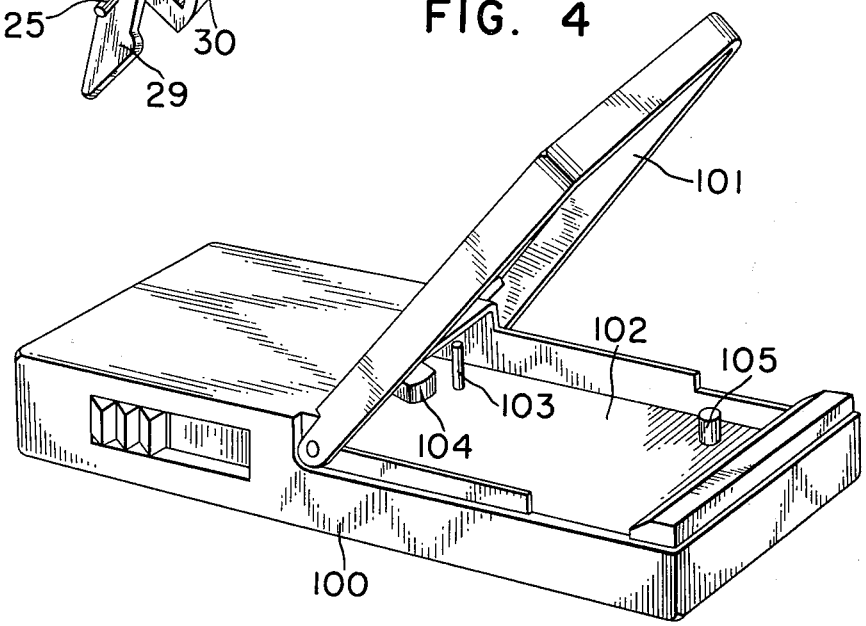
FIG. 4 is a perspective view of a compact magnetic recording-reproducing apparatus with which the cartridge of the present invention may be used.
Figure 5:
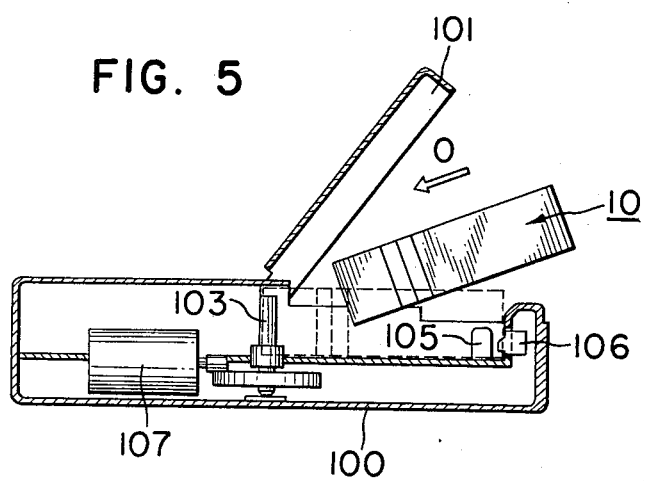
FIG. 5 is a longitudinal, vertical section of the FIG. 4 apparatus, showing the manner in which it is loaded with the endless tape cartridge of the present invention.

FIGS. 4 and 5 show a compact magnetic recording-reproducing apparatus with which the above-described cartridge 10 may be used. The magnetic recording-reproducing apparatus comprises a main body 100, an openable lid plate 101, a cartridge receiving chamber 102, a capstan 103, a magnetic head 104, a brake release member 105, a spring plate member 106 and drive means 107 for driving the capstan 103. In order to load the main body 100 with the cartridge 10, the lid plate 101 is opened in the manner as shown in FIG. 5, whereafter the cartridge 10 is inserted into the main body 100 toward the capstan 103 and magnetic head 104, as indicated by arrow O, and finally positioned in the main body 100 as indicated by phantom lines in FIG. 5. In the meantime, the brake release member 105 in the main body 100 is received in the opening 33 formed through the bottom wall $12_1$ of the cartridge 10 until it raises the cam member 29 (see FIG. 2-B), whereupon the wing-like member 27 of the brake means 24 is pivotally moved in clockwise direction against the force of the plate spring 31, as viewed in FIG. 2-B, whereby the end face of the wing-like member 27 is disengaged from the corresponding end face of the tape coil 16. Thus, the cartridge loading operation releases the braking action of the brake means 24 with the wing-like member 27 shifted to its phantom-line position shown in FIG. 2-B.

Figure 6:
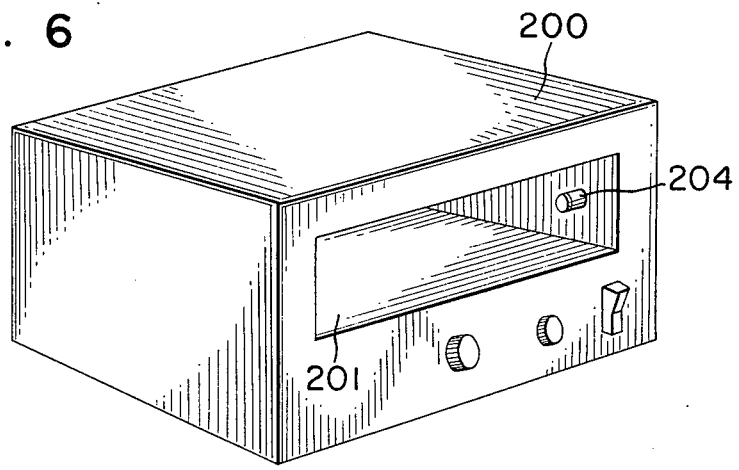
FIG. 6 is a perspective view showing another compact magnetic recording-reproducing apparatus with which the cartridge of the present invention may be used.
Figure 7:
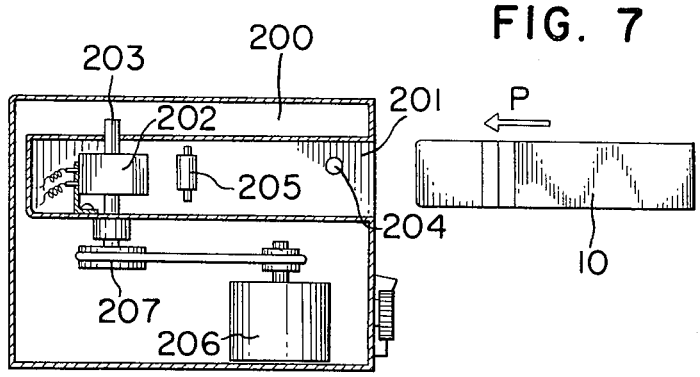
FIG. 7 is a longitudinal, vertical section of the FIG. 6 apparatus, showing the manner in which it is loaded with the endless tape cartridge of the present invention.

FIG. 6 and 7 show another magnetic recording-reproducing apparatus with which the cartridge 10 may be used but which has a different type of loading mechanism. It includes a main body 200, a cartridge insertion opening 201, a magnetic head 202, a capstan 203, a release pin 204 studded in a side wall of the opening 201, a resilient pressure roller 205 adapted to be resiliently received into V-shaped grooves formed in the side walls $11_1$ and $11_2$ of the cartridge 10 so as to hold the cartridge, drive means 206 for driving the capstan 203 via a belt 207.

The cartridge 10, when inserted into the main body 200 through the opening 201 in the direction of arrow P, causes the release pin 204 of the main body 200 to slide along and relative to a groove L formed in the side wall $11_1$ of the cartridge 10 (see FIG. 2-B) and further slide along the ramp of the cam member 28 in the brake means 24, so that the brake means 24 is rotated in clockwise direction against the force of the plate spring 31 (as viewed in FIG. 2-B), thereby disengaging the end face of the wing-like member 27 from the corresponding end face of the tape coil 16 and thus releasing the braking action.

On the other hand, in the cartridge 10 inserted into the magnetic recording-reproducing apparatus body, even if it is in reversed position, the end face of the tape coil 16 will be pressed against the rollers 221A, 21B and 21C by the reel flange 13 due to the gravity thereof so that the tape can be smoothly fed from the tape coil due to the rotational movement of the rollers. The brake means 24 is disposed on the same side of the cartridge as the rollers, and it is for this reason that the height of the cartridge 10 is made very small so as to permit the utilization of the space required for the rollers. More specifically, the brake means 24 is arranged so that it may utilize the space for the rollers 21A, 21B and 21C and may cock within the height defined by such space to thereby release the braking action and that removal of the cartridge from the magnetic recording-reproducing apparatus body may cause the brake means to apply a uniform braking action to the end face of the tape coil. It will thus be noted that the cartridge of the present invention has such an advantage of compactness as would be highly effective for use with the magnetic recording-reproducing apparatuses installed in motor vehicles and the like which are very often subjected to vibrations.

Figure 8A:
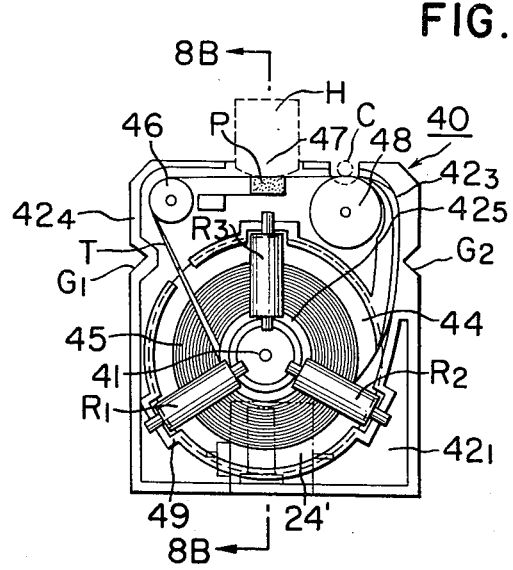
FIG. 8-A is a front view showing another embodiment of the endless tape cartridge according to the present invention with its cover plate being removed.
Figure 8B:
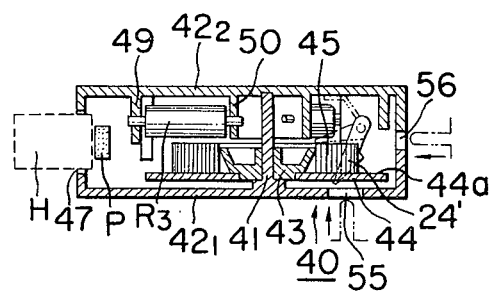
Figure 8C:
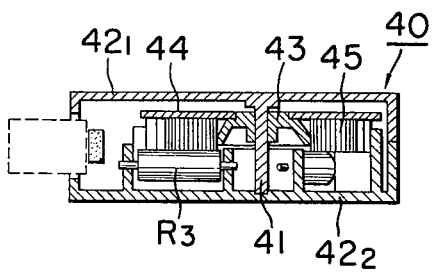
Figure 9A:
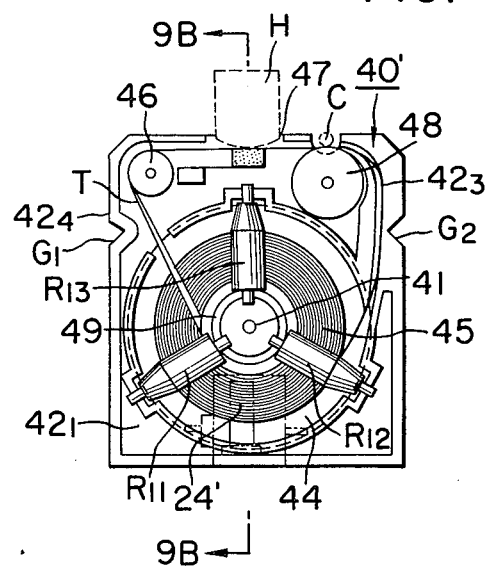
FIG. 9-A is a front view showing still another embodiment of the endless tape cartridge according to the present invention with its cover plate being removed.
Figure 9B:
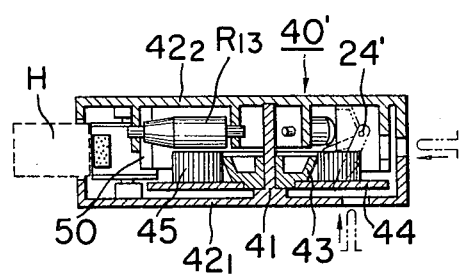
Figure 9C:
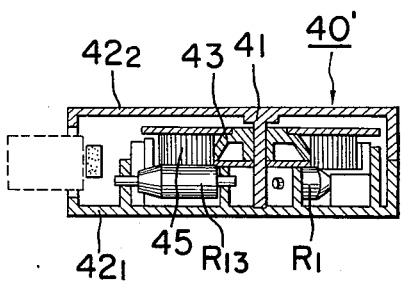
Figure 10A:
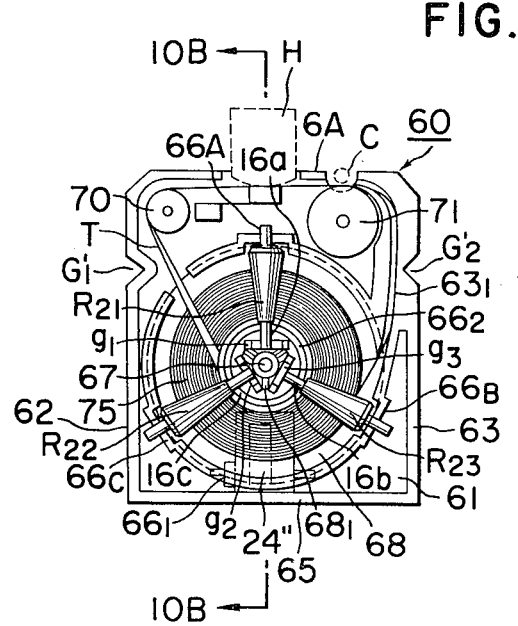
FIG. 10-A is a front view showing yet another embodiment of the endless tape cartridge according to the present invention with its cover plate being removed.
Figure 10B:
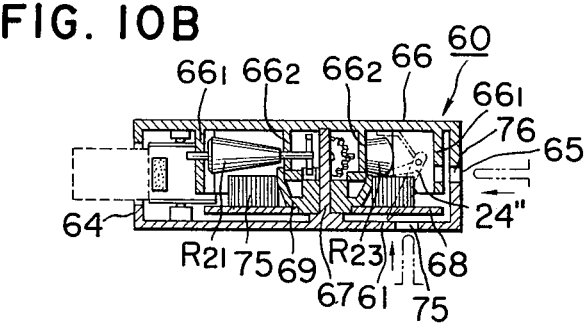
Figure 10C:
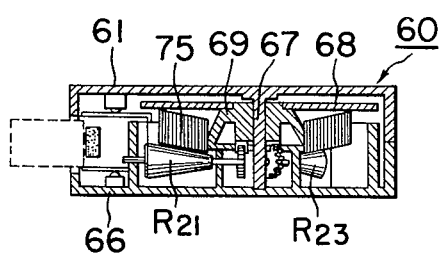
Figure 10D:
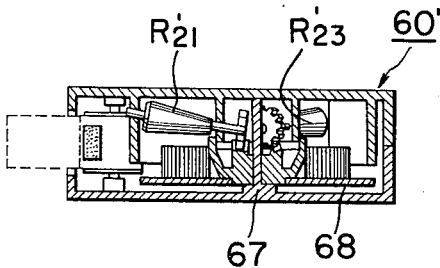

In the above-described embodiment, the cartridge of the present invention is provided with brake means and loose rollers, whereas FIGS. 8 to 10 show further preferred embodiments of the invention. The cartridges of these alternative embodiments are different according to differences in the shape and construction of the loose rollers, and it should be understood that the aforesaid brake means 24 may equally be provided in the various cartridges as shown in FIGS. 8 to 10, and that the loose rollers shown in FIGS. 8 to 10 may be positioned in the same way as those shown in FIG. 2-A. Although the brake means is omitted for simplicity in the cartridge of each subsequent embodiment, it will be appreciated that the brake means may be added to each of these alternative embodiments by utilizing the space required for the loose rollers to mount the brake means cockably within the height of that space so that its braking action may be released from outside the cartridge.

Referring to FIGS. 8 to 10, the brake means applicable to any of the embodiments shown there is indicated by dots-and-dash lines so as to facilitate the understanding of the shape of the loose rollers.

In FIGS. 8-A and 8-B, an endless tape cartridge is generally designated by reference numeral 40 and includes a pin 41 formed intergrally with and centrally of the bottom wall $42_2$ of the cartridge 40, a take-up core 43 loosely mounted on the pin 41, a reel flange 44 formed integrally with the core 43, an endless tape coil 45 wound on the reel flange 44, a guide roller 46, an opening 47 for inserting therethrough a magnetic head H, and a pinch roller 48. The guide roller 46 and pinch roller 48 are rotatably mounted on respective fixed shafts studded in the bottom wall of the cartridge 40. Concentric circular walls 49 and 50 are formed integrally with a cover plate $42_2$, and loose rollers $R_1$, $R_2$ and $R_3$ are disposed radially of the tape coils between these walls and journalled thereto.

The diameter of each roller $R_1$, $R_2$, $R_3$ is selected such that these rollers define an equal clearance with respect to the tape coil 45 when the latter is wound on the reel flange 44. A spring 1 ate P provides a tape pad secured to the bottom wall $42_1$ of the cartridge 40. The opposite side plates $42_3$ and $42_4$ of the cartridge 40 are formed with V-shaped grooves G1 and G2 engageable by a cartridge holder means 205 provided in the magnetic recording-reproducing apparatus body 200 as shown in FIGS. 6 and 7. The inner surface of the side plate $42_3$ is formed with a circular guide surface portion complementary to the outermost layer of the tape coil 45.

Brake means 24', indicated by imaginary lines, is substantially similar to that shown in the previous embodiment, and disposed between the rollers $R_1$ and $R_2$. As seen in FIG. 8-B, the brake means is so arranged that its brake force acting on the corresponding end face of the tape coil may be released by extraneous means through openings 55, 56 formed in the cartridge. Alternatively, the brake means 24' may be disposed in a space provided by spacing rollers $R_2$ and $R_3$ more closely in the manner as shown in FIG. 2-A.

With such an arrangement, insertion of the cartridge 40 into a tape recorder body (not shown) will cause the head H to enter the opening 47 and cause the holder means 205 to hold the cartridge 40, and further the brake force of the brake means will be released in the manner described above so as to permit the tape T to be led out from the innermost layer of the coil 45 and pass over the guide roller 46 to be nipped between the pinch roller 48 and the capstan C, whereafter the tape T will be driven along and in contact with the guide surface provided by the inner surface of the side plate $42_3$, whereby the tape will be wrapped around the outermost layer of the tape coil 45.

Where the cartridge 40 is used in its position as shown in FIG. 8-B, the tape T will drive the take-up core 43 as it is led out from the innermost layer of the tape coil 45 and accordingly, the reel flange 44 integral with the core 43 will in turn drive the tape coil 45 thereon. Therefore, as the tape T nipped between the pinch roller 48 and the capstan C is driven, the tape T thus fed will be wound round the outermost layer of the tape coil 45. In this way, the tape may be smoothly fed without any slack produced therein and without any excessive tightness produced in the tape coil 45.

Conversely, where the cartridge 40 is used in its seversed position as shown in FIG. 8-C, the reel flange 44 will drop along the pin 41 due to gravity and press the tape coil 45 against the rollers $R_1$–$R_3$ due to the weight of the reel flange itself. As the tape T nipped between the pinch roller 48 and the capstan C is driven, it will drive the take-up core 43 and therewith the reel flange 44, and the tape coil 45 will in turn be driven on the rollers $R_1$–$R_3$ by the reel flange 44 which is in pressure engagement with the corresponding end face of the tape coil 45. Thus, smooth tape feeding may be accomplished without producing any excessive tightness in the tape coil and without causing any slack in the tape T.

The side furface $44_a$ of the reel flange 44 which engages the corresponding end face of the tape coil 45 need not be specially treated for an increased friction coefficient, but such treatment would favorably affect the tape coil driving where the reel flange and take-up core are of light weight.

The loose rollers and the reel flange may be formed as of ABS resin and polyacetal resin, respectively, so as to provide a greater friction coefficient between the loose rollers and the end face of the tape coil than that between the reel flange and the face of the tape coil. This will ensure the inner and outer layer portions of the tape coil 45 to be driven at an equal velocity with the rotation of the loose rollers, which in turn will enable the peripheral velocities of the innermost and outermost layers of the tape coil to be substantially equal.

FIGS. 9-A to 9-C show a further modified cartridge 40' according to the present invention, which cartridge 40' is similar to the cartridge 40 of FIGS. 8-A to 8-C with an exception that rollers $R_{11}$, $R_{12}$ and $R_{13}$ are tapered only at the portion corresponding to the outermost layer portion of the tape coil. Similar parts are designated by similar numerals used in FIGS. 8-A to 8-C, and need not be described further. This embodiment will also achieve the tape feeding between the reel flange and the rollers as smoothly as in the above-described embodiments.

It will thus be appreciated that the present embodiment ensures smooth tape feeding to be accomplished by the gravity of the reel flange even when the cartridge is used in its reversed position. Moreover, each loose roller reduced in diameter at one end portion thereof provides a clearance greater than the tape width between the rollers and the reel flange, and the tape may pass through such clearance with the aid of the circular guide surface so as to be smoothly wound around the outermost layer of the tape coil, without using any complex mechanism but only by using a simple construction. Such a cartridge is very suitable as a compact portable cartridge.

FIGS. 10-A to 10-D illustrate a further embodiment of the cartridge according to the present invention. In FIG. 10-A, the cartridge is shown in front view and with its cover plate removed. In FIG. 10-A and the cross-sectional view of FIG. 10-B, an endless tape cartridge is generally designated by reference numeral 60 and includes a bottom plate 61, opposite side plates 62 and 63, front and rear end plates 64 and 65, and a top or cover plate 66. All these plates 61 to 66 are integrally formed of plastics or like material. As shown in FIG. 10-A, the inner surface $63_1$ of the side wall 63 is formed with a circular guide portion $63_1$ and the outer surfaces of the side plates 62 and 63 are formed with V-shaped retaining grooves G1' and G2', respectively, for engaging the holder member 205 of the magnetic recording-reproducing apparatus (FIGS. 6 and 7) during the insertion of the cartridge into the apparatus.

The cover plate 66 has an outer circular wall $66_1$ and an inner circular wall $66_2$ formed in the inner surface thereof. These outer and inner circular walls are formed with apertures 66A, 66B, 66C and 66a, 66b, 66c, respectively. A fixed pin 67 is studded centrally in the bottom plate of the cartridge 60, and a reel flange 68 formed integrally with a take-up core 69 is loosely mounted on the fixed pin 67. A guide roller 70 and a pinch roller 71 are rotatably mounted on respective fixed shafts studded in the bottom plate 61 of the cartridge.

A magnetic tape T is in an endless form and wound to form a tape coil 75 on the reel flange 68. As the innermost layer of the tape T is led out from the take-up core 69, the tape passes over the guide roller 70 and across the opening formed in the front end wall 64 for receiving a head H, thence passes over the pinch roller 71 and along the guide surface $63_1$ so as to be wound onto the outermost layer of the tape coil 75.

Driven rollers $R_{21}$, $R_{22}$ and $R_{23}$ are disposed radially of the tape coil 75 on the reel flange 68 and spaced apart from the corresponding end face of the tape coil. These rollers are journalled to the circular walls $66_1$ and $66_2$ at the apertures 55A, 66a, 66B, 66b, and 66C, 66c, respectively. Each of these rollers $R_{21}$, $R_{22}$ and $R_{23}$ is gradually tapered from its outer end toward its inner end. The upper end face of the take-up core 69 is formed with a bevel gear $68_1$, which is in meshing engagement with corresponding bevel gears $g_1$, $g_2$ and $g_3$ formed at the inner ends of the rollers $R_{21}$–$R_{23}$. The shape of each gear and the diameter of each roller $R_{21}$–$R_{23}$ are selected such that the peripheral velocity of each roller at its various areas is equal to the peripheral velocity of the reel flange at the portions thereof corresponding to those rollers when the rollers $R_{21}$–$R_{23}$ are driven with rotation of the take-up core 69.

Brake means 24'', which may be similar to that described previously, is shown to be disposed between the rollers $R_{22}$ and $R_{23}$, and as shown in FIG. 1-B, it is arranged such that its braking action imparted to the corresponding end face of the tape coil may be released by some extraneous means through openings 75 and 76 formed in the cartridge wall. Alternatively, the brake means may be disposed in a space provided by spacing the rollers $R_{23}$ and $R_{21}$ more closely as shown in FIG. 2-A.

When the cartridge 60 is inserted into a magnetic recording-reproducing apparatus, the head H and capstan C will enter the respective openings formed in the front wall of the cartridge 60, in the manner as indicated by broken lines, and will be urged into contact with the tape T. Thereupon the brake force of the brake means 24'' will be released in the manner as described already. As a result, the tape T nipped between the capstan C and the pinch roller 71 will be driven by the drive from the capstan C.

Where the cartridge 60 is used in its position as shown in FIG. 10-B, the tape T will be thus driven and led out continuously from the innermost layer of the tape coil to thereby drive the take-up core 69 and accordingly the reel flange 68. The tape T thus led out will pass over the head H and pinch roller 71 and along the guide surface $63_1$ so as to be wound on the outermost layer of the tape coil on the rotating reel flange 68. In the meantime, the rotating take-up core 69 causes the rollers $R_{21}$–$R_{23}$ to be rotated about their own axes at a velocity equal to that of the reel flange 68, but such rotation of these rollers is simply idle because the tape coil is rotating while maintaining itself on the reel flange 68 from its own weight.

In case where the cartridge 60 is used in its reversed position as shown in FIG. 10-C, the tape coil will shaft from the reel flange 68 onto the opposed rollers $R_{21}$–$R_{23}$ due to gravity. When thus received on the rollers $R_{21}$–$R_{23}$, the tape coil will be driven by these rollers because the rollers $R_{21}$–$R_{23}$ are now significantly driven from the take-up core 69 via bevel gears while the reel flange 68 is idly driven by the take-up core 69. Thus, the gradually tapered rollers $R_{21}$, $R_{22}$ and $R_{23}$ are rotated at the same peripheral velocity as that of the opposed side of the reel flange, whereby the rollers $R_{21}$–$R_{23}$ can perform substantially the same function as that of the reel flange 68. It will thus be seen that when the cartridge is used in its reversed position, the tape coil may be driven by the rollers $R_{21}$–$R_{23}$ as effectively as by the reel flange 68, thereby winding the tape around the outermost layer of the tape coil. This means that smooth tape feeding can be accomplished irrespective of the position taken by the cartridge during its use.

While the rollers $R_{21}$-$R_{23}$ in the present embodiment have been shown with their rotational axes being parallel to the plane of the cartridge's cover plate 66, the rollers may also be arranged in the manner as shown in the cartridge 60' of FIG. 10-D, wherein rollers $R_{21}'$, $R_{22}'$ and $R_{23}'$ are journalled with their lower side being parallel to the corresponding end face of the tape coil so as to readily direct the tape onto the outermost layer of the tape coil.

Detailed description has been made of various embodiments of the endless tape cartridge, especially of the roller construction and arrangement, according to the present invention. Addition of the described brake means to the endless tape cartridge of the present invention for use with magnetic recording-reproducing apparatuses will enable such cartridge to accomplish smooth tape feeding in either of the normal and reversed positions of the cartridge. Furthermore, except during the use of the cartridge, the brake means is in uniform resilient engagement with the corresponding end face of the tape coil in the cartridge to thereby prevent loosening of the tape coil. In addition, the fact that both the brake means and the rollers are provided on the same side of the cartridge's cover plate and that the brake means is operably mounted in the space required for mounting the rollers contributes to a great reduction in the height of the entire cartridge, and thus leads to the provision of a very compact endless tape cartridge of highly excellent performance and high practical value.

Although the present invention has been shown and described with respect to the endless tape cartridge for use with magnetic recording-reproducing apparatuses, it should be understood that the invention is not limited to such cartridge alone but it may equally and directly be applicable to cartridges of the type wherein other strip material such as film similar in shape to tape may be contained in the form of a coil.

I claim:

1. An endless tape cartridge comprising:
   a housing;
   a tape coil in endless form;
   a reel member including a reel hub and a reel flange for rotatably supporting said endless tape coil a a normal operative position, and
   a brake member for preventing movement of said tape coil when said cartridge is not in use, said brake member including a wing-like member pivotally journalled in said housing and engageable with one end face of said tape coil, a resilient member for pressing said wing-like member against one end face of said tape coil and at least two releasing members for disengaging said wing-like member from said end face of said tape coil against the pressing force of said resilient member, each of said releasing members including a cam portion for receiving force in a direction approximately normal to the direction of a force externally applied, said applied force being applied, in the case of a first releasing member, in the side-to-side direction of said cartridge and in the case of the second releasing member in direction parallel to the axis of the reel, to effect releasing and to maintain the released condition.

2. An endless tape cartridge according to claim 1, also comprising:
   a plurality of roller members radially provided in said housing opposite to said reel member for rotatably supporting said tape coil together with said reel member when said cartridge is upside down with the reel flange located on the top side of said reel member,
   the reel flange of said reel member being movable in the direction of its axis of rotation so as to press said tape coil against said roller members when said cartridge is upside down, and
   said brake member being provided in one of the interstitial spaces defined by said roller member.

3. An endless tape cartridge according to claim 2, wherein said roller members are tapered, but are tapered only at a portion of said members corresponding to the outermost layer portion of said tape coil.

4. An endless tape cartridge according to claim 3, wherein a friction coefficient of said roller members with respect to said tape coil is greater than a friction coefficient between said reel flange and said tape coil.

5. An endless tape cartridge comprising:
   a housing;
   an endless tape coil in endless form;
   a reel member including a reel hub and a reel flange for rotatably supporting said endless tape coil at a normal operative position;
   a plurality of roller members radially provided in said housing opposite to said reel member for rotatably supporting said tape coil together with said reel member when said cartridge is upside down, with the reel flange located on the top side of said reel member, the reel flange of said reel member being movable axially and pressing said tape coil against said roller members when said cartridge is upside down;
   a rotational force transmitting member for transmitting the rotational force of said reel member to said roller members, and
   a brake member provided in one of the interstitial spaces defined by said roller members for preventing movement of said tape coil when said cartridge is not in use, said brake member including a wing-like member pivotally journalled in said housing and engageable with one end face of said tape coil and at least two releasing members for disengaging said wing-like member from said end face of said tape coil, each of said releasing members including a cam portion for receiving force in the direction approximately normal to the direction of force externally applied, said applied force being applied, in the case of a first releasing member, in the side-to-side direction of said cartridge, and in the case of the second releasing member in a direction parallel to the axis of said reel, to effect releasing and to maintain the released condition.

6. An endless tape cartridge according to claim 5, wherein each of said roller members has a diameter gradually reducing in magnitude in the direction toward said reel hub, for matching the peripheral velocity of said reel flange at the portions thereof opposite to said roller members.

7. An endless tape cartridge according to claim 6, wherein said roller members are journalled in said housing in such a manner that their peripheral surfaces each pass through a line generally parallel with the end face of said tape coil and directed in a radial direction with reference to said tape coil.

* * * * *